Patented Nov. 1, 1938

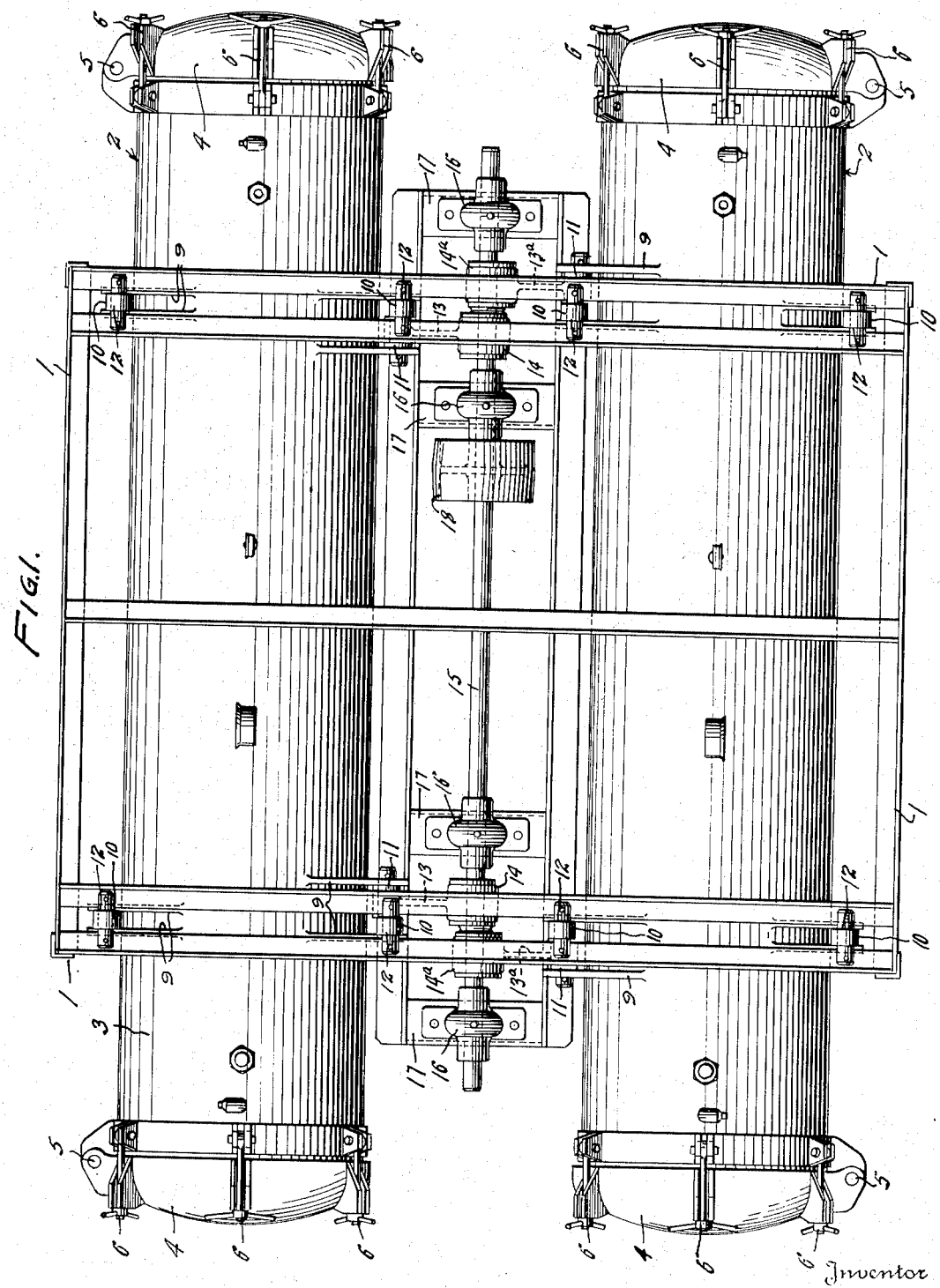

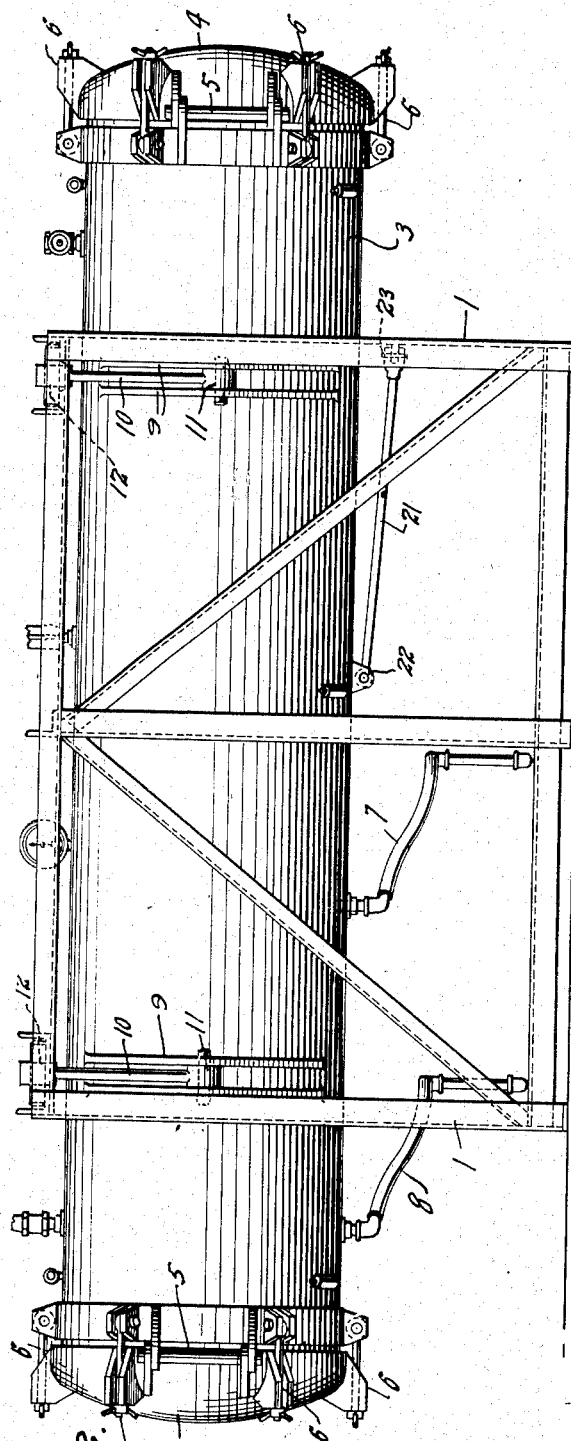
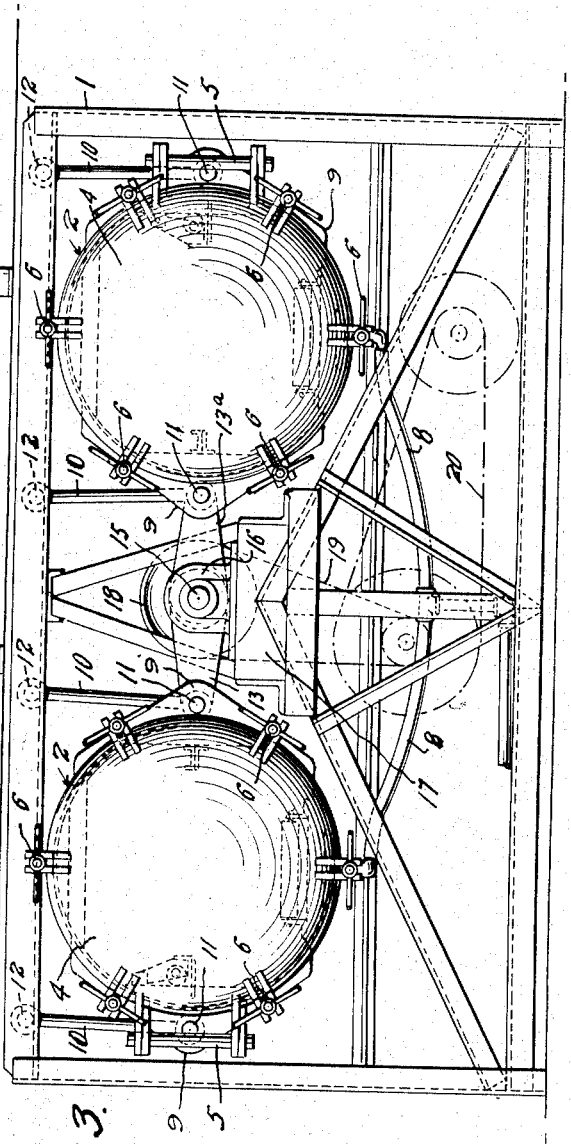

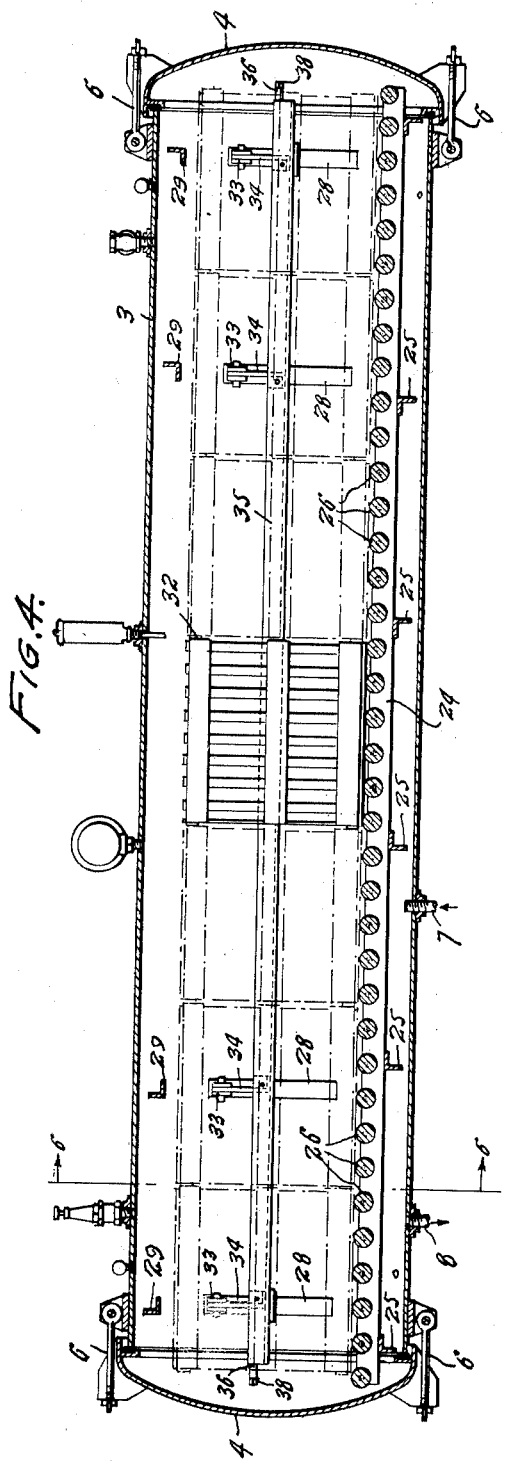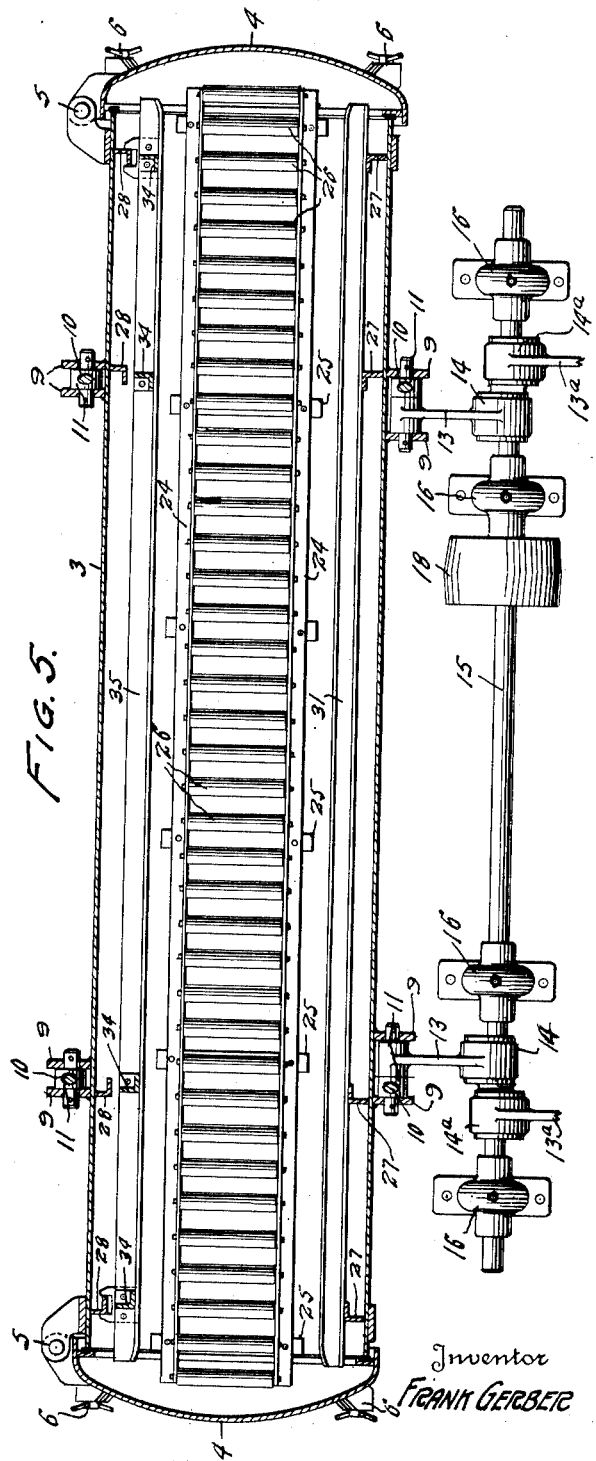

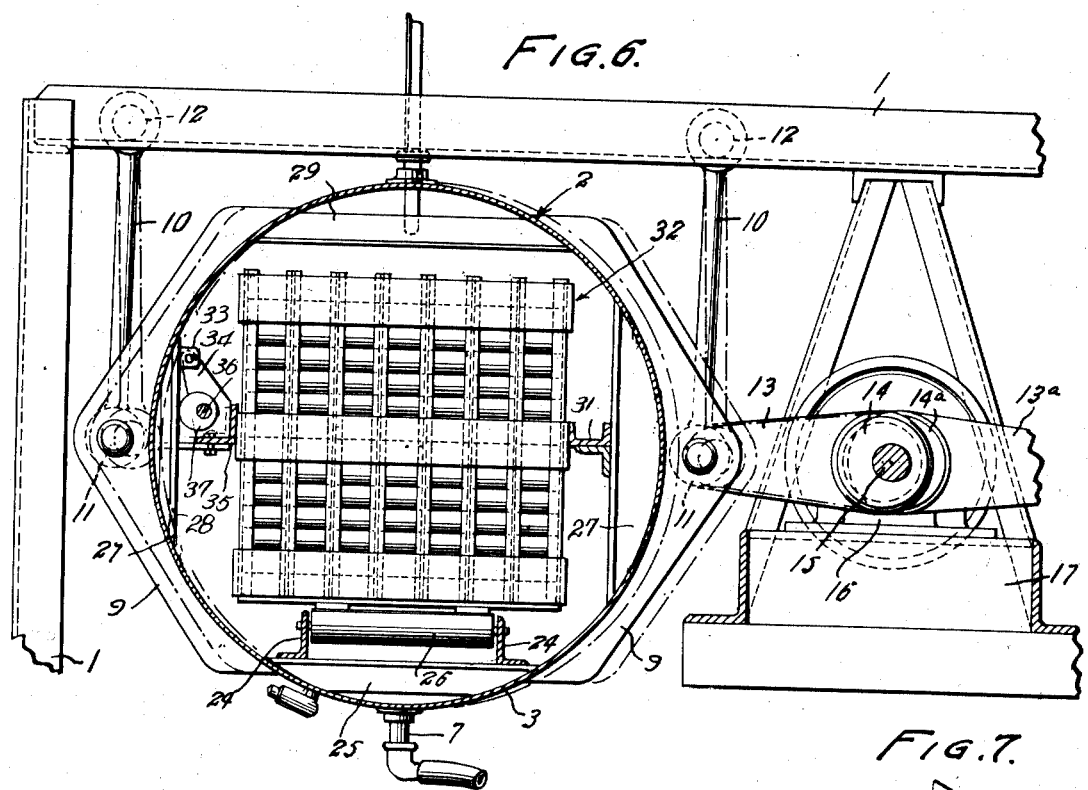

2,134,817

UNITED STATES PATENT OFFICE 2,134,817

RECIPROCATING COOKER

Frank Gerber, Fremont, Mich., assignor to Gerber Products Company, a corporation of Michigan Application September 26, 1934, Serial No. 745,638

9 Claims. (Cl. 126—272)

This invention relates to the processing of foods, and more particularly has reference to the sterilization of canned food products.

As is well known, it is common practice to sterilize canned foods such as canned vegetables, fruits, and similar products, after they have been placed in the cans and the cans have been hermetically sealed. There are, of course, minimum temperature and time conditions necessary to effect such sterilization, and these conditions must be observed for all portions of the canned contents. For instance, the center of the contents must be subjected to such conditions as well as the outward layers. Due to the slow heat conductivity of the food products there results an excessive cooking of the exterior layers in order to secure the minimum temperature and time conditions at the center of the can.

It has been recognized that agitation of the can during sterilization tends to insure a uniform cooking, but prior processes and apparatus have been open to certain disadvantages. These prior devices have been expensive of construction and operation, and in general are ineffective for commercial operation.

One of the objects of the invention is to overcome such disadvantages.

Another object of this invention is to provide an effective process and apparatus for the sterilization of canned foods which not only insures a higher grade product but also materially reduces the time necessary for sterilization, thereby effecting substantial economies in plant operation.

To secure the above and other important objects, as will more fully appear herein, this invention in general comprises the concept of subjecting canned food products to the necessary temperature to effect sterilization of the contents and at the same time agitating the cans in the direction of their longitudinal axis.

In the accompanying drawings there is shown one specific embodiment of an apparatus, it being distinctly understood, however, that various modifications may be made therein without departing from the scope of the invention.

In these drawings, in which corresponding numerals indicate the same parts:

Figure 1 is a top plan view of the device.

Figure 2 is a side elevational view of the device shown in Figure 1.

Figure 3 is an end elevational view.

Figure 4 is a longitudinal vertical sectional view.

Figure 5 is a longitudinal horizontal sectional view.

Figure 6 is a cross sectional view along the line 6—6 of Figure 4.

Figure 7 is a detailed view in perspective of the actuating means for locking cases of cans within a retort.

Figure 8 is a view in perspective of the crates for holding the cans.

As best shown in Figures 1 through 3, there is provided a suitable frame indicated generally as 1, which may be made up of angle irons or other appropriate members. The frame 1 is shown as supporting a pair of retorts 2, although it is of course obvious that the number of retorts may be varied as desired. The retorts are preferably made up of cylindrical body portions 3 provided with heads 4. The heads are hinged to the body as at 5, and suitable wing nut locks 6 are provided in order to secure a pressure-tight fit between the heads and body during a cooking operation. Appropriate pressure gauges, thermometers, vent cocks, and valves are provided in order to maintain the necessary temperature and pressure conditions within the retort.

Steam, or other suitable heating medium, is introduced to the retort through a flexible inlet conduit 7 and is exhausted from the retort by way of flexible outlet 8. If steam is the heating medium, the outlet 8 may empty into a suitable steam trap. The retorts 2 are provided with two pairs of webs 9 upon each side. Of course, the number of pairs of webs for any retort will depend upon the conditions of operation. The retorts are supported from the frame by means of arms 10 which are provided at their lower ends with bosses 11 adapted to be fitted between and pivotally connected to the webs 9. The upper ends of the arms 10 are likewise provided with bosses 12 which are pivoted to the support member 1. It will therefore be observed that the arms 10 permit the retorts to swing from the support.

As best shown in Figure 5, the webs 9 on the opposed sides of each retort are spaced further apart than merely the width of the boss 11, and these webs are adapted to pivotally receive an eccentric arm 13, as well as the boss 11. Of course, if desired, separate webs may be provided for the eccentric arms 13. Eccentric arm 13 is provided with an eccentric strap 14 which fits upon an eccentric mounted on a rotating shaft 15. Corresponding eccentrics, straps 14—a and arms 13—a, are provided for the opposite retort and are operated by the same shaft 15.

As shown in Figures 1, 3 and 5, the shaft 15 is journaled in suitable bearing members 16 which in turn are mounted on an appropriate support 17. A pulley wheel 18 is keyed to the shaft 15 and is turned by a suitable train of pulleys 19 and 20, connected to a source of power. Of course, gearing or other power transmission may be employed to rotate shaft 15. It will be seen that by positioning the shaft 15 intermediate the pair of retorts a single drive for both retorts may be provided, but it will of course be appreciated that individual shafts 15 might be provided for each of the retorts, if desired.

A tie rod 21 is pivoted to the bottom of each retort as at 22 and also pivoted to the frame as at 23. The yoke 23 of the tie rod may be slotted in order to compensate for the slight change in angle of the tie rod, and the pivot 22 should also permit slight angular adjustment of the tie rod with respect to the retort. However, in view of the fact that the swing of the retorts upon the arms 11 is relatively slight, usually less than one inch for each retort, the tie rod 21 prevents any appreciable longitudinal movement of the retorts. It should be pointed out that in actual operation the retorts are reciprocated in the neighborhood of 140 times a minute, but of course the number of reciprocations may be varied by controlling the motor according to the conditions of any particular operation.

Extending longitudinally and at the base of each retort are a pair of spaced channel irons 24 which are suitably secured to the body of the retort by means of struts 25. A series of rollers 26 are mounted between the bars 24 and are adapted for free rotation to thereby provide a roller conveyor for crates of cans. Spaced along the sides of the retorts are a series of vertical webs 27 and 28, as best shown in Figure 6.

Further strengthening may be obtained by the use of horizontal webs 29 spaced above each of the webs 27 and 28. The webs 27 carry a guide rail 31 intermediate their height and extending the length of the retort. One side of the crate 32, which carries the cans, is adapted to bear against the guide rail 31.

As best shown in Figure 7, the webs 28 are each provided with a pair of ears 33 to which is pivoted an arm 34. The arm 34 is secured to an angle iron 35 which extends the length of the retort opposite the guide rail 31. A rotatable shaft 36 extends the length of the retort and passes through each of the arms 34. Keyed to the shaft 36 adjacent each of the arms 34 is an eccentric 37. Rotation of shaft 36 therefore swings the arm 34 on its pivot to the ears 33 and consequently moves the angle iron 35 toward or away from the center of the retort. To facilitate rotation of the shaft 36, the ends thereof are squared as at 38 and are adapted to receive a suitable crank member. As will be noted, the arm 34 is pivoted off-center so that it tends to swing against the webs 28 so far as permitted by the eccentric 37.

As shown in Figure 6, the angle iron 35 is adapted to bear against the side of the crate 32 and to securely lock the crate in a fixed position within the retort.

Although crates of varying construction may be employed, a crate such as shown in Figure 8 is preferable. Such a crate is made up of end members 39 which are joined together by means of longitudinal slats 41. Vertical slats 42 may extend the height of the sides of the crate. The bottom of the crate may be made up of a solid member 43, or the base may also be formed by a plurality of slats. Strips 44 may be placed upon the bottom of the crate in order to serve as wearing surfaces.

Partitions are formed in each crate by vertical members 45 which extend the height of the crate and which are spaced from one another a distance slightly greater than the diameter of the cans to be received. Flanged members 46 are secured to one side of the slats 45 and project a sufficient distance into the channels formed by the member 45 to further sub-divide such channels into individual wells for a row of cans. The members 46 are spaced so that flanges are substantially the length of the can. As shown in the cut out portion of Figure 8, the cans 47 are arranged in the crates on their sides and in rows of single cans, one upon the other. The members 45 and 46 prevent any substantial movement of the cans within the crate.

Holes 48 are drilled in the base of each well so that there is a free circulation of the heating medium about each can which is facilitated by the spaces between the side slats 42.

The operation of my invention is believed to be obvious from the foregoing. The crates 32 are filled with the cans to be sterilized. These cans are arranged in the wells of the crate, lying on their sides. When the crates are filled, one of the heads 4 of the retort is swung open and the crates are advanced into the retort on the roller conveyor. During this time the eccentric 37 is in such a position that the angle iron 35 lies against the webs 28, thus permitting free movement of the crates within the retort. When enough crates have been inserted in the retort to fill its capacity, a suitable instrument is affixed to the squared end 38 of the shaft 36 and the shaft rotated to force the angle iron 35 against the sides of the crate to thereby lock the crate between the guide 31 and angle iron 35. The head of the retort is then closed and securely sealed by means of the locking members 6. Steam, or other heating medium, is introduced through inlet 7 and the motor started. During the course of cooking the cans are being constantly agitated to effect a rapid, uniform and thorough cooking of the contents.

Upon completion of the cooking operation one of the heads of the retorts may be opened, the angle iron 35 released from the crates and the crates then lowered out of the retort. In actual operation it is preferable to feed the cans from one end of the retort and remove them from the other. This may be readily accomplished in view of the fact that both heads are pivoted to the retort and both ends of the shaft squared as at 38.

The advantages of the invention are obvious. In the first place, the contents of each can are being constantly shaken during the cooking, thereby bringing constantly new portions of the contents into contact with the ends and sides of the can. To be particularly noted, is the fact that the reciprocation is longitudinally of a can which makes for a more effective agitation and consequently heat distribution. The time required for sterilizing is substantially reduced from those cases where the cans are maintained stationary or even where they are rotated or agitated in other manners. Not only is a superior product thus obtained, but a substantial economy is effected in plant operation.

It will be noted that this device is comparatively simple of construction and in operation and is therefore inexpensive to manufacture, and its cost of operation exceeds but little, if any, that of a stationary cooker.

While there is shown and described the preferred embodiment of the invention, it is to be understood that it is not confined to the precise details of construction herein set forth, by way of illustration, as it is apparent that many changes and variations may be made therein by those skilled in the art, without departing from the spirit of the invention, or exceeding the scope of the appended claims.

I claim:

1. A sterilizing device comprising a retort pivotally hung upon a supporting member, means for introducing a sterilizing medium to the retort and means for imparting a limited swinging movement to the retort in substantially only a horizontal plane.

2. A sterilizing device for canned foods comprising a support, crates for containing the cans, a retort adapted to hold the crates containing the cans, means for pivotally hanging the retort from the support, a rotatable shaft parallel with the retort, means for translating rotation of the shaft into reciprocation of the retort, means for introducing a sterilizing medium to the retort, and means for locking the crates in a stationary position within the retort.

3. A retort comprising a body portion adapted to receive a plurality of crates arranged in a row, a stationary rail within said body portion extending the length of the body portion and adapted to contact with one side of the row of crates, and a movable rail in said body portion upon the opposite side of the crates adapted to engage said crates to maintain them stationary with respect to said body portion.

4. A retort comprising a body portion adapted to receive a plurality of crates arranged in a row, a series of transversely extending spaced rollers in the base of the body portion, a stationary rail in said body portion above and to one side of the rollers extending the length of the body portion and against which one side of the row of crates is adapted to rest, a pivoted rail in said body portion upon the opposite side of the row of crates, and means for swinging said last mentioned rail to engage its corresponding side of the crates, said means including a shaft and an eccentric mounted thereon.

5. A sterilizing device for canned foods comprising a support, a pair of cylindrical retorts pivotally carried by said support, a rotatable shaft intermediate the retorts, means reciprocating the retorts transversely upon rotation of the shaft, means for preventing appreciable longitudinal movement of the retorts, means for introducing a sterilizing medium to the retorts, a train of spaced rollers extending the length of each retort, and adapted to support a row of crates, and guide rails for the crates when passing upon the rollers, one of said guide rails being adjustable to fixedly clamp the crates within the retorts.

6. A sterilizing device comprising a support, a retort, means for admitting a sterilizing medium to the retort, pairs of webs formed upon the retort, pins extending through the webs, arms pivoted to the support and to the pins, and means for imparting to the retort a limited swinging movement in substantially only a horizontal plane.

7. An apparatus for agitation of products in retorts comprising a support, two retorts pivotally joined to the support, a rotatable shaft between the retorts, an eccentric upon said shaft, and straps upon the eccentric connecting the eccentric to the retorts, such straps pivoting on the retorts, whereby said retorts are caused to be agitated by the rotation of the shaft.

8. An apparatus for agitation of products in retorts comprising a support, two retorts, pairs of arms pivotally joined to the support and to the retorts, said arms suspending the retorts and permitting them to swing in the same plane, means for imparting a limited swinging movement to the retorts in substantially only a horizontal plane, and means to prevent appreciable movement along the axis of swing of said retorts.

9. An apparatus for agitation of products in retorts comprising a support, a retort pivotally swung from the support, means for imparting a limited swinging movement to the retort in substantially a horizontal plane, a tie rod yieldably joined to the retort and to the support, said tie rod lying substantially in the same vertical plane as the axis of swing for said retort, whereby appreciable movement along said axis is prevented.

FRANK GERBER.